United States Patent [19]
Johnson

[11] 4,286,315
[45] Aug. 25, 1981

[54] CONVERTER APPARATUS

[75] Inventor: Frederick O. Johnson, Monroeville, Pa.

[73] Assignee: Westinghouse Electric Corp., Pittsburgh, Pa.

[21] Appl. No.: 61,532

[22] Filed: Jul. 27, 1979

[51] Int. Cl.³ .......................................... H02P 13/24
[52] U.S. Cl. ..................................... 363/87; 363/129; 318/345 E
[58] Field of Search ................. 363/37, 81, 85, 87–88, 363/128, 129; 323/22 SC, 23, 25, 34; 307/252 P, 252 Q; 318/345 E, 345 R, 345 G

[56] References Cited

U.S. PATENT DOCUMENTS

| | | |
|---|---|---|
| 3,713,011 | 1/1973 | Johnson et al. .................. 363/81 X |
| 4,063,146 | 12/1977 | Oliver ............................... 363/87 X |

Primary Examiner—William M. Shoop
Assistant Examiner—Peter S. Wong
Attorney, Agent, or Firm—D. R. Lackey

[57] ABSTRACT

Converter apparatus including gate drive control of the stored energy type. Control logic arms the next controlled rectifier device to be gated a predetermined period of time following the gating of the immediately preceding controlled rectifier device in the gating sequence.

5 Claims, 6 Drawing Figures

CONVERTER APPARATUS

BACKGROUND OF THE INVENTION

1. Field of the Invention

The invention relates in general to converter apparatus, and more, specifically to gate drive arrangements for power converter apparatus.

2. Description of the Prior Art

Converter apparatus of the type which utilizes controlled rectifier devices, such as thyristors, connected to interchange electrical energy between alternating and direct current circuits, require a gate drive arrangement which provides gate drive signals for the thyristors in response to a phase controller. The phase controller selects or controls the conduction angle of the thyristors. The conduction angle is controlled to regulate a predetermined parameter of the power converter, such as load current or load voltage.

U.S. Pat. No. 3,713,011, which is assigned to the same assignee as the present application, discloses a gate drive arrangement of the stored energy type. In other words, instead of having the gate drive circuitry start the process of generating a gate drive signal for each thyristor when it receives a gating request from the phase controller, the gate circuits for all channels are "armed" and the gating request is used to release previously stored electrical energy to provide the gating pulse. This assures rapid and timely gating of the thyristors.

SUMMARY OF THE INVENTION

Briefly, the present invention is new and improved converter apparatus of the type which includes controlled rectifier devices connected, and gated in a predetermined sequence, to interchange electrical power between alternating and direct current circuits. The converter includes a phase controller and a gate drive arrangement for controlling the conduction angle of the controlled rectifier devices in response to an error signal which indicates any difference between the actual operation of the converter apparatus and the desired operation.

The gate drive arrangement is of the stored energy type, reserving the hereinbefore mentioned benefits of this concept while incorporating certain improvements, compared with the arrangement of the hereinbefore mentioned U.S. Pat. No. 3,713,011.

More specifically, the new and improved gate drive arrangement of the present invention generates logic signals which correspond to the conduction patterns of the thyristors in the power converter. These logic signals are utilized to sequentially arm the various gating channels, with the logic signal associated with the last thyristor to be gated being used to arm the channel of the next thyristor to be gated, a predetermined number of electrical degrees before the actual firing or conduction angle. Thus, only one gating channel associated with a non-conductive thyristor is armed at any instant. The gating channel of the last thyristor to be gated may be re-armed and triggered again concurrently with the triggering of the next thyristor to be rendered conductive to insure that the proper thyristors are conductive during each gating period.

Thus, at most, only two gating channels are armed at any instant. In a three-phase, full-wave converter bridge having six thyristors, the power loading is reduced to one-third, compared with an arrangement which arms all channels. Further, since the only non-conductive thyristor which is armed is the next thyristor to be gated, the new and improved gate-drive arrangement of the present invention is practically immune to erroneous gate drive production due to disturbances in the power supply and/or control signals, reducing the incidence of blown fuses due to improper gating of the thyristors.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
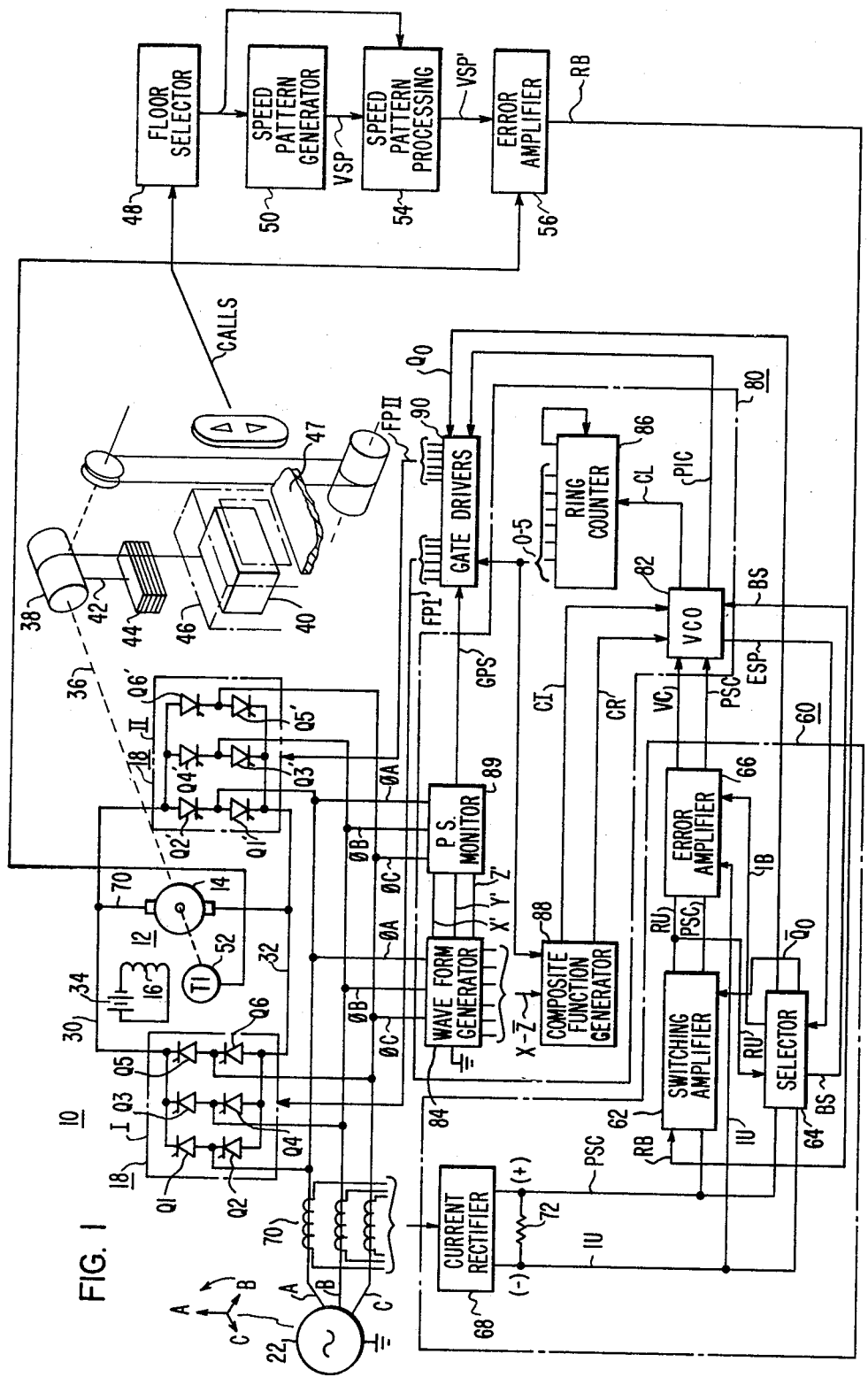
FIG. 1 is a block diagram illustrating converter apparatus of the type which may utilize the teachings of the invention.

Referring now to the drawings, and to FIG. 1 in particular, there is shown converter apparatus 10 constructed according to the teachings of the invention. Converter apparatus 10 is illustrated and will be described relative to its application in an elevator system, but the invention is equally applicable to other applications and should not be limited to the specific example set forth.

More specifically, converter apparatus 10 includes a direct current drive motor 12 having an armature 14 and a field winding 16. The armature 14 is electrically connected to an adjustable source of direct current potential. The source of potential may be a dual converter 18, as illustrated, or a single converter.

The dual converter 18 includes first and second converter banks I and II, respectively, which may be three-phase, full-wave bridge rectifiers connected in parallel opposition. Each converter includes a plurality of static controlled rectifier devices. For example, bank I includes controlled rectifier devices Q1, Q2, Q3, Q4, Q5, and Q6 connected to interchange electrical power between alternating and direct current circuits. The alternating current circuit includes a source 22 of alternating potential and line conductors A, B, and C. The direct current circuit includes buses 30 and 32, to which the armature 14 of the direct current motor is connected. The dual bridge converter 18 not only enables the magnitude of the direct current voltage applied to armature 14 to be adjusted, by controlling the conduction or firing angle of the controlled rectifier devices, but it allows the direction of the direct current flow through the armature to be reversed when desired by selectively operating the converter banks. When converter bank I is operational, current flow in the armature 14 would be from bus 30 to bus 32, and when converter bank II is operational, the current flow would be from bus 32 to bus 30.

The field winding 16 of the drive motor 14 is connected to a source 34 of direct current voltage, represented by a battery in FIG. 1, but any suitable source such as a single bridge converter may be used.

The drive motor 12 includes a drive shaft indicated generally by broken line 36, to which a traction sheave 38 is secured. An elevator car 40 is supported by a rope 42 which is reeved over the traction sheave 38, with the other end of the rope being connected to a counterweight 44. The elevator car is disposed in a hoistway 46 of a structure having a plurality of floors or landings, such as floor 47, which floors are served by the elevator car.

The movement mode of the elevator car 40 and its position in the hoistway 46 are controlled by a floor selector 48 which in turn selects the polarity of the voltage applied to the armature 14 and the drive motor 12. The magnitude of the direct current voltage applied to armature 14 is responsive to a velocity command signal VSP provided by a suitable speed pattern generator 50.

The speed pattern generator 50 provides its speed pattern VSP in response to a signal from the floor selector 48. A suitable floor selector and a suitable speed pattern generator are shown in U.S. Pat. No. 3,750,850, which is assigned to the same assignee as the present application.

A suitable control loop for controlling the speed, and thus the position of the elevator car 40 in response to the velocity command signal VSP includes a tachogenerator 52 which provides a signal responsive to the actual speed of the elevator car. The speed pattern signal VSP is processed in a processing function 54, and the processed speed pattern VSP' is compared with the actual speed signal from generator 52 in an error amplifier 56. The output signal RB is compared with the actual current flowing in the operational converter bank via a circuit 60. A suitable speed pattern processing function is disclosed in my concurrently filed application Ser. No. 061,538, entitled "Elevator System". Suitable compensation for the error signal is disclosed in U.S. Pat. No. 4,030,570, which is assigned to the same assignee as the present application.

Converter apparatus 10 is operated in a closed current loop mode, using current feedback to operate the converter essentially as a current amplifier. The current comparison circuit 60 includes a switching amplifier 62 which converts the output signal RB from compensation amplifier 58 into a unidirectional signal, a bank selector 64, an error amplifier 66, and a current rectifier 68. Current transformer 70 provides signals responsive to the current flowing in line conductors A, B, and C to the operational converter bank, and the current rectifier 68 provides a unidirectional voltage signal IU across a resistor 72. Conductor PSC is the power supply common.

Unidirectional current feedback signal IU is proportional to the magnitude of the current flowing through the load circuit regardless of the direction of the current flowing through the load. Signal RB is bidirectional with its polarity indicating in which direction the current should flow through the load circuit, i.e., which bridge should be operational, with the magnitude of the bidirectional reference signal indicating the desired magnitude of the load current.

The bidirectional reference signal RB is switched by switching amplifier 62 in response to a switching signal $\overline{Q}_0$, to provide a substantially unidirectional reference signal RU. Intelligence for providing the switching signal $\overline{Q}_0$ for the switching amplifier 62 is provided by the bank selector 64. Bank selector 64 develops switching signal $\overline{Q}_0$, as well as the complement $Q_0$, through logic circuitry and predetermined system parameters.

The unidirectional reference signal RU and the unidirectional feedback signal IU are compared in error amplifier 66, and an error signal VC is developed which has a magnitude and polarity responsive to any difference between the two input signals. The current comparison circuit or function 60 may be the same as set forth in U.S. Pat. No. 3,713,011 and hence it is not described in detail.

The error signal VC is applied to a phase controller 80 which, along with gate drivers 90, provides firing pulses FPI and FPII for converter banks I and II, respectively. The firing pulses control the conduction angle of the controlled rectifier devices in response to the error signal VC. Bank reversal, and therefore selection of which converter should be operational, is responsive to the switching signals $Q_0$ and $\overline{Q}_0$. In order to maintain synchronism between the phase controller 80 and the converters 16 and 18, the conduction angle is maintained between predetermined limits or end stops, which are referred to as rectification and inversion end stops. A signal ESP is provided by phase controller 80 when the inversion end stop is reached, which is applied to selector 64. Selector 64 also provides a signal BS which forces an inversion end stop condition, and a signal IB which biases the error amplifier 38.

The phase controller 80 includes a voltage controlled oscillator or VCO 82, a waveform generator 84, a ring counter 86, and a composite function generator 88. A power supply monitor 89 may also be provided. The output of the phase controller is applied to the gate drivers 90, which in turn provide the firing pulses FPI, or firing pulses FPII, depending upon which bank is operational. A phase controller 80 which may be used is collectively described in my concurrently filed application Ser. No. 61,533, entitled "Converter Apparatus", and in concurrently filed application Ser. No. 061,325, entitled "Timing Waveform Generator", filed in the name of W. R. Caputo, both of which are assigned to the same assignee as the present application. These applications are hereby incorporated into the present application by reference.

The purposes of describing the present invention, it is sufficient to point out that the VCO 82 provides a clock signal CL for the ring counter 86 and a signal PIC for the gate drivers 90, and the power supply monitor 89 provides a signal GPS. The clock signal CL is a serial train of logic signals, the leading edges of which request the gating of the next thyristor in the predetermined gating sequence. Signal PIC is a serial train of logic signals, whose leading edges are aligned with the leading edges of the clock signal CL, but which have a predetermined duration, longer than the duration of the clock signal CL, with the duration of the logic signals PIC determining the arming angle for each thyristor in the gate driver circuitry 90, as will be hereinafter explained. Signal GPS is a logic one when the power supply is normal, and a logic zero when the gate drivers 90 should be inhibited due to abnormalities in the power supply, or other suitable reasons.

Ring counter 86 is a decade counter/divider connected to function as a six-step counter. Outputs 0, 1, 2, 3, 4, and 5 of ring counter 86 sequentially provide a logic one signal, advancing the logic one from output to output each time it is clocked by the signal CL. The graph of FIG. 3A illustrates the sequential 0, 1, 2, 3, 4, and 5 output signals of ring counter 86, as well as the reset signal provided by output 6. Output six is tied back to the reset input of the ring counter, such that when output 6 goes to a logic one, it immediately resets the counter to its initial state, to provide a logic one signal at the 0 output. Signal 0-5 are applied to the gate drivers 90, which are shown in detail in FIG. 2. The appearance of each new logic signal in the 0-5 sequence starts the gating process for a different controlled rectifier device. The controlled rectifier devices are gated in the sequence Q1, Q6, Q3, Q2, Q5, and Q4, and are gated by signals 0, 1, 2, 3, 4, and 5, respectively.

Output signals 0-5 are also used as logic signals for the composite function generator 88, in the development of the rectification and inversion end stops for each of the controlled rectifier devices, as described in my hereinbefore mentioned concurrently filed application.

Figure 2A:
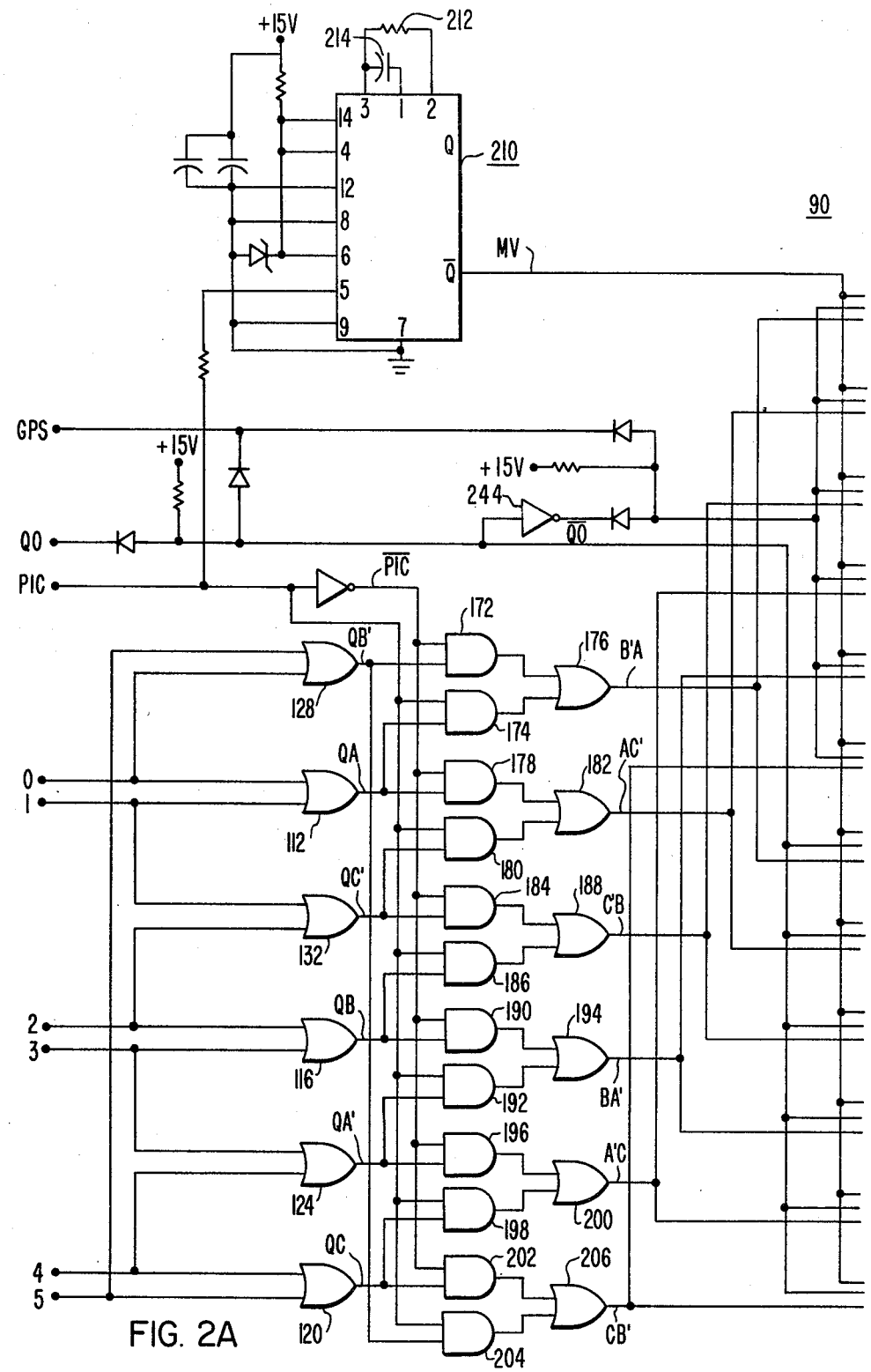
FIGS. 2A and 2B are schematic diagrams of a gating arrangement constructed according to the teachings of the invention.
Figure 2B:
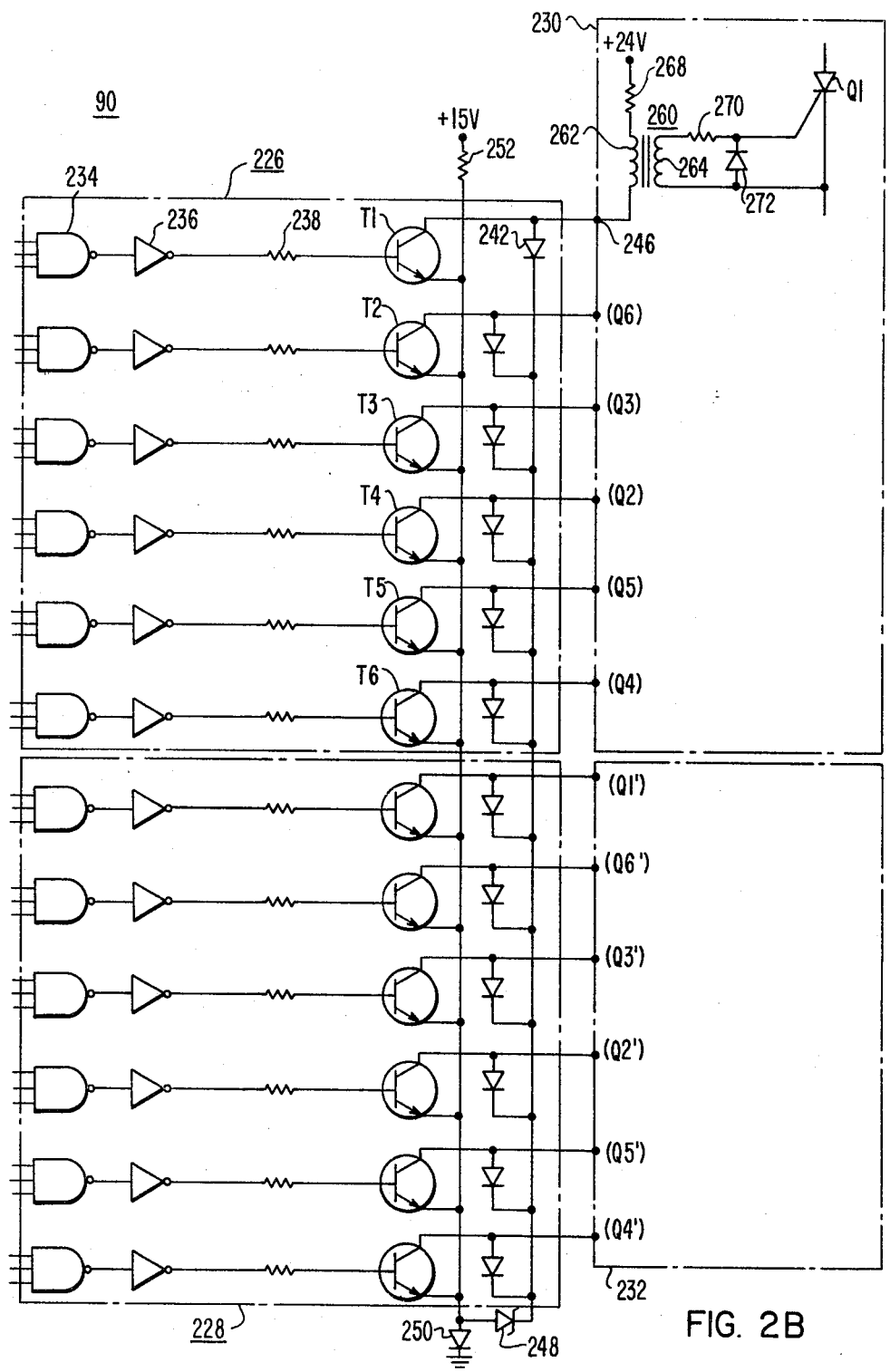
Figure 3A:
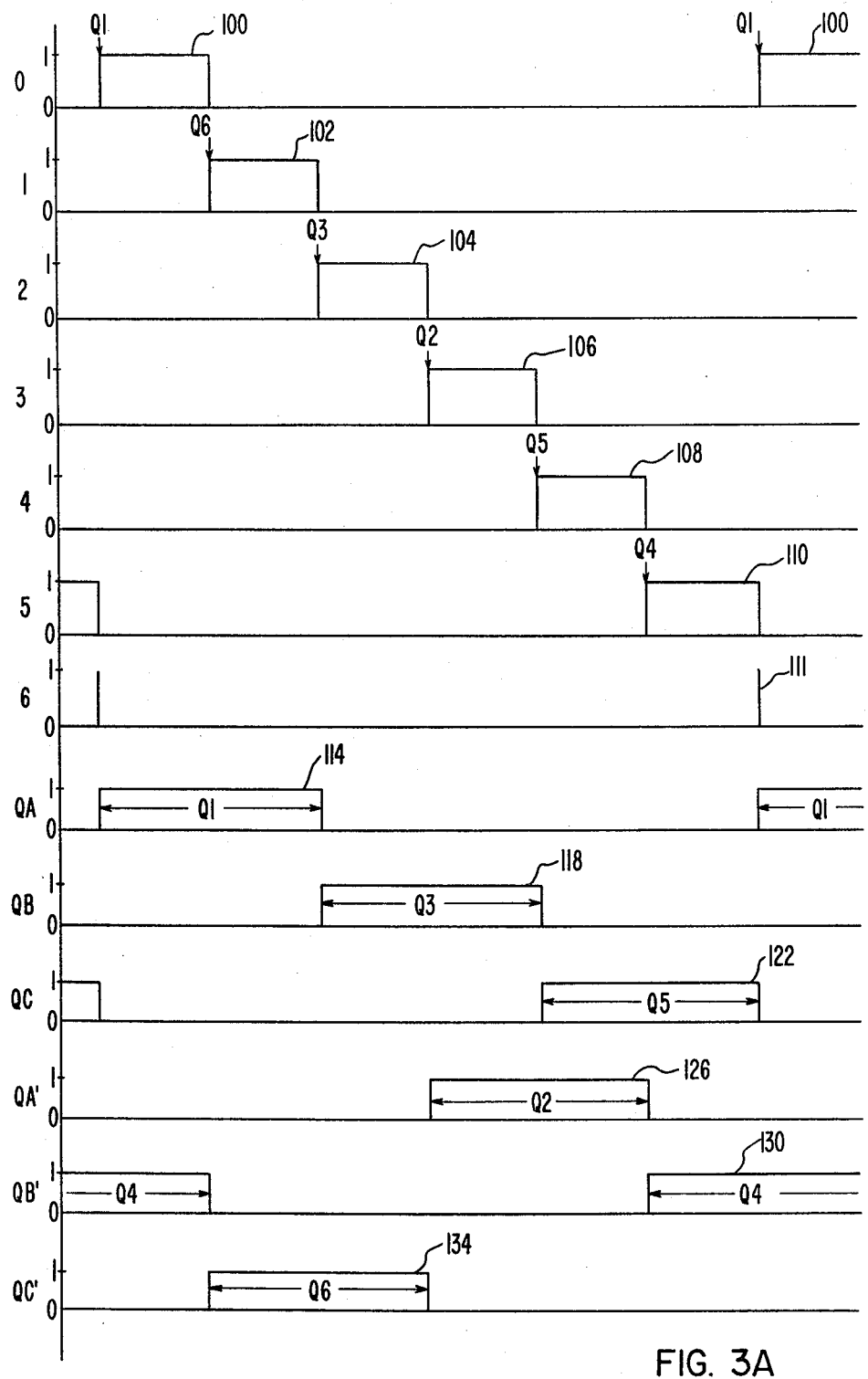
FIGS. 3A, 3B and 3C are graphs which may be aligned to illustrate the time relationship of certain signals used in the gating arrangement of FIGS. 2A and 2B.
Figure 3B:
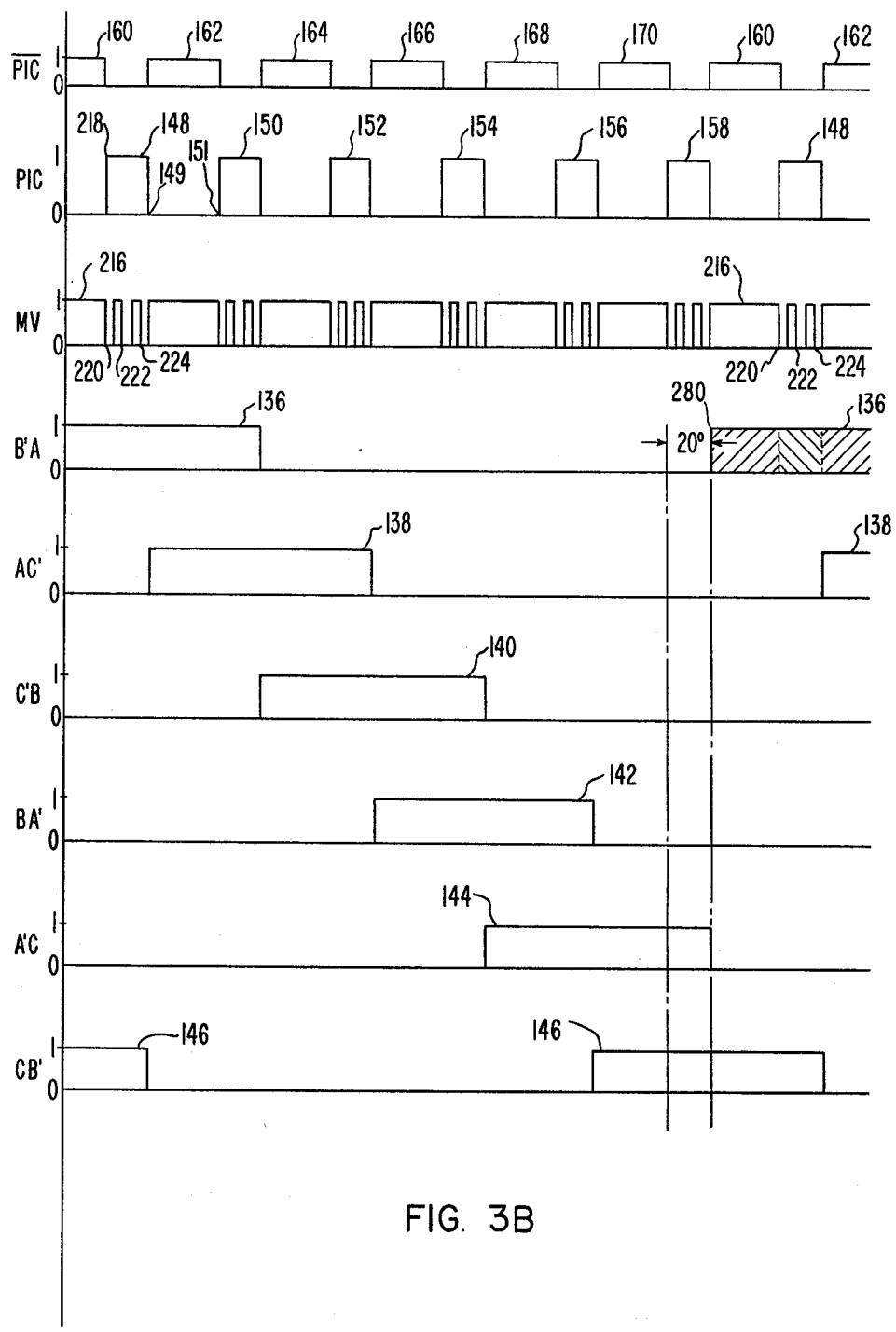
Figure 3C:
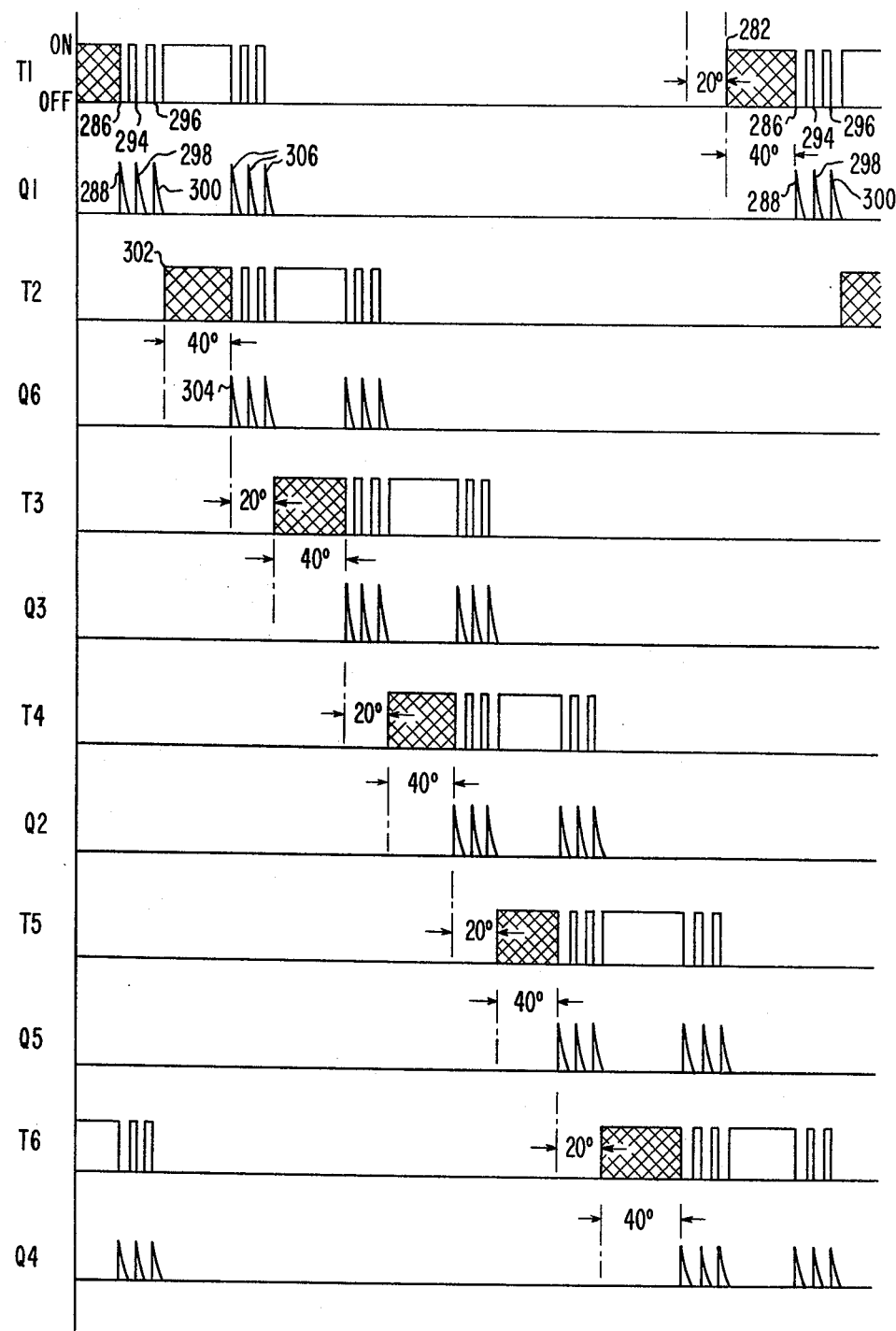

Referring now to FIGS. 2A and 2B, there is shown a schematic diagram of a gate drive arrangement constructed according to the teachings of the invention, which may be used for the gate drive arrangement 90 shown in FIG. 1. FIGS. 3A, 3B and 3C will also be referred to while describing FIGS. 2A and 2B, as FIGS. 3A, 3B and 3C illustrate the timing relationship between the various signals applied to, and developed by, the gate drive arrangement.

As hereinbefore stated, the ring counter 86 provides logic signals 0 through 5 which initiate the gating of controlled rectifier devices Q1, Q6, Q3, Q2, Q5, and Q4, respectively, with logic signals 0 through 5 being indicated by reference numerals 100, 102, 104, 106, 108 and 110 in FIG. 3A. Output 6 provides a reset signal 111 which resets the counter to repeat its cycle. As illustrated in FIG. 3A, the associated thyristor is gated in response to the leading edge of the logic signal. Each logic signal 0-5 persists until the next logic signal in the sequence appears. Gate driver 90 shown in FIGS. 2A and 2B logically combines the logic signals 0-5 to provide a set of logic signals QA, QB, QC, QA', QB', and QC', which correspond to the conduction patterns of thyristors Q1, Q3, Q5, Q2, Q4, and Q6, respectively. For example, logic signals 0 and 1 are combined in OR gate 112 to provide logic signal QA as shown in FIG. 3A at 114. Logic signal QA corresponds to the conduction pattern of thyristor Q1. In like manner, logic signals 2 and 3 are combined in OR gate 116 to provide logic signal QB, the conduction pattern of thyristor Q3 represented by signal 118 in FIG. 3A. Logic signals 4 and 5 are combined in OR gate 120 to provide logic signal QC, the conduction pattern of thyristor Q5 represented by signal 122 in FIG. 3A; logic signals 3 and 4 are combined in OR gate 124 to provide logic signal QA', the conduction pattern of thyristor Q2 represented by signal 126 in FIG. 3A; logic signals 0 and 5 are combined in OR gate 128 to provide logic signal QB', the conduction pattern of thyristor Q4 represented by signal 130 in FIG. 3A; and logic signals 1 and 2 are combined in OR gate 132 to provide logic signal QC', the conduction pattern of thyristor Q6 represented by signal 134 in FIG. 3A.

Logic signals QA, QB, QC, QA', QB', and QC' are further logically combined with one another and with the serial signal PIC and its complement $\overline{PIC}$ to provide logic signals B'A, AC', C'B, BA', A'C and CB', indicated by reference numerals 136, 138, 140, 142, 144, and 146 in FIG. 3B. As hereinbefore stated, the leading edge of the serial train of logic signals PIC requests the gating of the next thyristor in the gating sequence. The logic signals PIC which request the gating of thyristors Q1, Q6, Q3, Q2, Q5, and Q4 are indicated by reference numerals 148, 150, 152, 154, 156, and 158, respectively, in FIG. 3B. The complement of signal PIC, i.e. $\overline{PIC}$, is used to "arm" the gating circuit of the next thyristor to be gated, with $\overline{PIC}$ signals 160, 162, 164, 166, 168, and 170, respectively arming the gating circuits for thyristors Q1, Q6, Q3, Q2, Q5, and Q4.

More specifically, logic signal B'A is provided by AND gates 172 and 174, and an OR gate 176, signal AC' is provided by AND gates 178 and 180, and an OR gate 182, signal C'B is provided by AND gates 184 and 186, and an OR gate 188, signal BA' is provided by AND gates 190 and 192, and an OR gate 194, signal A'C is provided by AND gates 196 and 198, and an OR gate 200, and signal CB' is provided by AND gates 202 and 204, and an OR gate 206.

AND gate 172 logically combines signals $\overline{PIC}$ and QB' to provide one input to OR gate 176, and AND gate 174 logically combines signals PIC and QA to provide the other input to OR gate 176. AND gate 172 performs the function of keeping the output of OR gate 176 high when the gating circuitry for thyristor Q1 should be armed, and AND gate 174 performs the function of keeping the output of OR gate 176 high when thyristor Q1 should be gated. Thus, signal B'A starts when the gating circuits for thyristor Q1 should be armed, and it terminates when the need for gating thyristor Q1 no longer exists.

In like manner, AND gate 178 logically combines signals $\overline{PIC}$ and QA, AND gate 180 logically combines signals PIC and QC', OR gate 182 logically combines the outputs of AND gates 178 and 180, and the resulting signal AC' requests the arming of thyristor Q6 and enables it to be gated; AND gate 184 logically combines signals $\overline{PIC}$ and QC', AND gate 186 logically combines signals PIC and QB, OR gate 188 combines the outputs of AND gates 184 and 186, and the resulting signal C'B requests the arming of thyristor Q3 and enables it to be gated; AND gate 192 logically combines signals $\overline{PIC}$ and QB, AND gate 192 logically combines signals PIC and QA', OR gate 194 combines the outputs of AND gates 190 and 192, and the resulting signal BA' requests the arming of thyristor Q2 and enables it to be gated; AND gate 196 logically combines signals PIC and QA', AND gate 198 logically combines signals $\overline{PIC}$ and QC, OR gate 200 logically combines the outputs of AND gates 196 and 198, and the resulting signal A'C requests the arming of thyristor Q5 and enables it to be gated; and AND gate 202 logically combines signals PIC and QC, AND gate 204 logically combines signals PIC and QB', OR gate 206 logically combines the outputs of AND gates 202 and 204, and the resulting signal CB' requests the arming of thyristor Q4 and enables it to be gated.

Signal PIC, which when true, requests the gating of the next thyristor, is additionally applied to the astable input of a gateable astable multivibrator 210, such as RCA's CD4047, with the $\overline{Q}$ output providing a signal MV. When logic signal PIC is low, the $\overline{Q}$ output of multivibrator 210 is high, and thus signal MV is continuously high, as illustrated at 216 in FIG. 3B. When signal PIC goes high, requesting the gating of the next thyristor in the gating sequence, multivibrator 210 becomes free running, switching its $\overline{Q}$ output rapidly between logic one and logic zero levels at a rate determined by the values of resistor 212 and capacitor 214. For example, the multivibrator may have a pulse duration of about 200 microseconds, and a period between pulses of about 200 microseconds, with the "pulse" referring to a logic one signal at the $\overline{Q}$ output of multivibrator 210 when it is free-running. As illustrated in FIG. 3B, when signal 148 of the serial pulse train goes high at 218, signal MV goes low at 220 and then starts free running for the duration of signal 148. For example, it may switch low two additional times at 222 and 224, while signal 148 is high. Logic signals B'A, AC', C'B, BA', A'C, and CB' are logically combined with the output signal MV of the multivibrator 210 to arm and initiate the gating of the associated thyristor. When two converter banks are used, as illustrated in the FIG. 1 embodiment, an additional bank selection signal Q0 is provided. Signal Q0 selects one converter bank when it is high and the other converter bank when it is low. Signal GPS from the power supply monitor 89 is connected via suitable diodes to inhibit both banks when it is at the logic zero level. For example, the gating channel for banks I and II shown in FIG. 1 are indicated in FIG. 2B within the broken outlines 226 and 228, respectively. The pulse transformers and thyristors for banks I and II are indicated generally by broken outlines 230 and 232, respectively. Since the gating channels, pulse transformers, and thyristors for each bank are similar, only the gating channel and pulse transformer arrangement for thyristor Q1 of bank I will be described in detail. Also, only the pulse transformer for Q1 is shown in detail, since the pulse transformer arrangements for the remaining thyristors will be similar. Gating channels 226 for converter bank I include a gating channel for thyristor Q1 which includes a NAND gate 234, an inverter gate 236, a resistor 238, and NPN transistor T1, and a diode 242.

NAND gate 234 has three inputs, with one being connected to receive signal MV from multivibrator 210, another being connected to receive the bank selector signal $\overline{Q0}$ via an inverter gate 244, and the remaining input connected to receive signal B'A. The output of NAND gate 234 is inverted by inverter gate 236 and applied to the base of transistor T1 via resistor 238. The collector of transistor T1 is connected to an output terminal 246, and also to the anode of diode 242. The cathode of diode 242 is connected to ground via a Zener diode 248 and a diode 250. The emitter of transistor T1 is connected to a positive source of unidirectional potential via a resistor 252, an also to the junction between diodes 248 and 250. Diode 242 and Zener diode 248 function to clamp or limit the collector voltage during the operation of the channel.

A pulse transformer 260 is provided for thyristor Q1, having a primary winding 262 and a secondary winding 264. One end of the primary winding 262 is connected to output terminal 246, and the other end is connected to a source of positive potential via a resistor 268. The secondary winding 264 has one end connected to the gate of thyristor Q1 via a resistor 270, and its other end is connected to the cathode of thyristor Q1. A diode 272 limits the reverse voltage across the gate-cathode junction. When transistor T1 is turned on, current flows from the positive source through resistor 268, primary winding 262, transistor T1, and diode 250 to ground. When transistor T1 is turned off, the energy stored in the primary winding 262 is "dumped" into the secondary winding 264 to provide a firing or gating pulse for thyristor Q1.

Referring now to FIGS. 2A, 2B, 3B and 3C, with signal MV high and signal Q0 low (QO is high), NAND gate 234 will have a high output until logic signal B'A goes high. When the output of NAND gate 234 is high, inverter 236 turns transistor T1 off. Signal B'A goes high at 280 in FIG. 3B when signals $\overline{PIC}$ and QB' are high, turning on transistor T1 at 282 in FIG. 3C. Point 282 lags signal QB' by about 20 electrical degrees, i.e. the selected duration of signal PIC, arming thyristor Q1 by turning on transistor T1. Transistor T1 is turned on about 40 electrical degrees before thyristor Q1 is gated, i.e. by the duration of signal $\overline{PIC}$. When the multivibrator signal MV goes low at 220, transistor T1 turns off at 286 providing a gating pulse 288 for Q1, turning Q1 on. Signal MV additionally goes low at 222 and 224, turning transistor T1 on and then off at 294, and then on and off at 296, providing two additional gating pulses 298 and 300, to assure turn-on of thyristor Q1.

About 20 electrical degrees following the gating of thyristor Q1, transistor T2 is switched on at 302 to arm the gating circuits for thyristor Q6, and about 40 degrees later, gating pulses 304 are provided for gating thyristor Q6. It will be noted that signal B'A is of sufficient duration to again arm gating circuit for thyristor Q1, providing additional gating pulses 306 for thyristor Q1 simultaneously with the gating pulses 304 for the newly turning on thyristor Q6. Thus, only two transistors are conductive at any instant, one of which is arming the gating channel of the next thyristor in the gating sequence, and one which is arming the gating channel of the last thyristor to be gated on to provide additional gating pulses which assure that it will stay turned on to the completion of its desired conduction period. Thus, the requirements on the power supply are only one-third of that required by gating arrangements which arm all channels. Further, the gating arrangement of the invention is less susceptible to false gating and fuse blowing, as only one gating channel for a non-conductive thyristor is armed at any instant.

When the firing angle is constant, the time between the termination of one signal PIC, such as termination 149 of signal 148 in FIG. 3B, and the start of the next signal PIC, such as start 151 of signal 150, is constant. The duration of signal $\overline{PIC}$ is thus constant. When the firing angle is being changed to change the output voltage of the operative converter, the time between points 149 and 151 will change. Thus, while the time of storing electrical energy for the device to be gated, prior to the gating time, is normally a predetermined constant, this time will vary during the time the firing angle is changing.

I claim as my invention:
1. Converter apparatus, comprising:
   a source of alternating potential,
   a load circuit,
   converter means having controlled rectifier devices connected, and gateable in a predetermined sequence, to interchange electrical energy between said source of alternating potential and said load circuit,
   gate drive means including pulse means for storing and subsequently releasing electrical energy to provide a gate drive pulse for each controlled rectifier device,
   and control means for said pulse means, said control means providing signals which initiate the storage of electrical energy by the pulse means for each controlled rectifier device, normally a predeter- mined number of electrical degrees immediately prior to the time the controlled rectifier device is to be gated, and which subsequently triggers a release of the stored energy precisely when the controlled rectifier device is to be gated, said predetermined number of electrical degrees being selected such that electrical energy is stored for only one currently non-conductive device at any instant.

2. The converter apparatus of claim 1 wherein the pulse means for each controlled rectifier device includes a pulse transformer having a primary winding selectively connectable to a source of unidirectional potential via solid state switching means, and a secondary winding connected to the controlled rectifier device, with the control means switching the solid state switching means to a conductive state when electrical energy is to be stored, and switching the solid state switching means to a non-conductive state when the energy stored in the primary winding is to be transferred to the secondary winding to provide a gating signal for the associated controlled rectifier device.

3. Converter apparatus, comprising:

a source of alternating potential, a load circuit, converter means having controlled rectifier devices connected, and gateable in a predetermined sequence, to interchange electrical energy between said source of alternating potential and said load circuit, gate drive means including pulse means for storing and subsequently releasing electrical energy to provide a gate drive pulse for each controlled rectifier device, and control means for said pulse means, said control means providing signals which initiate the storage of electrical energy by the pulse means for each controlled rectifier device, normally a predetermined number of electrical degrees immediately prior to the time the controlled rectifier device is to be gated, and which subsequently triggers a release of the stored energy precisely when the controlled rectifier device is to be gated, said predetermined number of electrical degrees being selected such that the electrical energy is stored for only one currently non-conductive device at any instant, said control means further concurrently storing energy for the last of the presently conductive controlled rectifier devices to be gated, such that electrical energy is stored, at any instant, for a maximum of two controlled rectifier devices.

4. Converter apparatus, comprising:

a source of alternating potential, a load circuit, converter means having controlled rectifier devices connected, and gateable in a predetermined sequence, to interchange electrical energy between said source of alternating potential and said load circuit, gate drive means including pulse means for storing and subsequently releasing electrical energy to provide a gate drive pulse for each controlled rectifier device, and control means for said pulse means, said control means providing signals which initiate the storage of electrical energy by the pulse means for each controlled rectifier device, normally a predetermined number of electrical degrees immediately prior to the time the controlled rectifier device is to be gated, and which subsequently triggers a release of the stored energy precisely when the controlled rectifier device is to be gated, said control means providing a serial train of spaced logic signals, the leading edges of which coincide with the gating of a controlled rectifier device, and a group of logic signals, each of which corresponds to the conduction pattern of a different controlled rectifier device, said control means logically combining the logic signal from the group associated with the last controlled rectifier device to be gated with a logic signal from the serial train to determine when to initiate the storage of electrical energy for the next controlled rectifier device to be gated.

5. The converter apparatus of claim 4 wherein the storage of electrical energy for the next controlled rectifier device to be gated is determined by the start of the conduction pattern signal associated with the last controlled rectifier device to be gated, delayed by the duration of a logic signal from the serial train of logic signals.

* * * * *